US011815370B2

(12) United States Patent
Tange et al.

(10) Patent No.: US 11,815,370 B2
(45) Date of Patent: Nov. 14, 2023

(54) DETERMINATION OF WIND TURBINE GENERATOR POSITION

(71) Applicant: VESTAS WIND SYSTEMS A/S, Aarhus N. (DK)

(72) Inventors: Kent Tange, Ry (DK); Daniel De Figueiredo Maria, Oporto (PT)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/988,434

(22) Filed: Nov. 16, 2022

(65) Prior Publication Data
US 2023/0152128 A1  May 18, 2023

(30) Foreign Application Priority Data

Nov. 16, 2021 (DK) .......................... PA 2021 70562

(51) Int. Cl.
| | |
|---|---|
| G01D 5/244 | (2006.01) |
| F03D 13/20 | (2016.01) |
| F03D 17/00 | (2016.01) |
| F03D 7/04 | (2006.01) |
| G05D 3/12 | (2006.01) |
| H02P 6/16 | (2016.01) |

(52) U.S. Cl.
CPC .......... *G01D 5/2448* (2013.01); *F03D 7/042* (2013.01); *F03D 13/20* (2016.05); *F03D 17/00* (2016.05); *G05D 3/12* (2013.01); *H02P 6/16* (2013.01)

(58) Field of Classification Search
CPC .. F03D 17/00; G01D 5/00; G05D 3/00; H02P 6/00
See application file for complete search history.

(56) References Cited

U.S. PATENT DOCUMENTS

| | | | |
|---|---|---|---|
| 6,598,196 B1 | 7/2003 | Bussard et al. | |
| 2013/0270829 A1 | 10/2013 | Miyamoto | |
| 2015/0355044 A1 | 12/2015 | Cardinal et al. | |
| 2018/0230970 A1* | 8/2018 | Slack | F03D 17/00 |
| 2019/0145381 A1 | 5/2019 | Gbadamassi et al. | |
| 2022/0187105 A1* | 6/2022 | Yoshihiro | G01D 5/2448 |

FOREIGN PATENT DOCUMENTS

| | | | | |
|---|---|---|---|---|
| EP | 2887023 A2 * | 6/2015 | ............... | G01B 7/30 |
| JP | 2010130739 A | 6/2010 | | |
| WO | 2018062864 A2 | 4/2018 | | |

OTHER PUBLICATIONS

1st Technical examination of your patent application for Danish Patent Application No. PA 2021 70562, dated Jun. 8, 2022.
Search Report for Danish Patent Application No. PA 2021 70562, dated Jun. 8, 2022.
European Patent Office, Extended European Search Report for Application 22207182.1-1002 dated Mar. 30, 2023.

* cited by examiner

*Primary Examiner* — Elton K Wong
(74) *Attorney, Agent, or Firm* — Patterson + Sheridan, LLP (57) ABSTRACT

A method for determining angular position of a generator shaft of a wind turbine is presented. The method includes receiving a position signal, from an encoder position sensor of the wind turbine, indicative of an angular position of the generator shaft. The method includes determining a compensation signal to compensate for a disturbance signal in the received position signal indicative of an imperfection associated with the encoder position sensor. The method includes modifying the position signal by applying the determined compensation signal to the received position signal to determine angular position.

12 Claims, 11 Drawing Sheets

DETERMINATION OF WIND TURBINE GENERATOR POSITION

TECHNICAL FIELD

The invention relates to the determination of wind turbine generator position and, in particular, to the determination of angular position of a generator shaft of a wind turbine based on a signal from an encoder sensor of the wind turbine.

BACKGROUND

Wind turbines are typically controlled to maximise energy capture and power production while minimising loads experienced by various wind turbine components. Wind turbine control is typically based on, inter alia, signals received from a number of sensors measuring various parameters associated with the operation of a wind turbine.

One such sensor is an encoder sensor associated with a generator shaft of a wind turbine for measuring an angular position of the generator shaft. An angular or rotational speed of the generator shaft (or generator) may then be determined based on the encoder sensor signal.

The generator angular position or speed may be used for various wind turbine control functions or scenarios. Typically, wind turbine control involves adjusting parameters such as a pitch angle of one or more wind turbine rotor blades or a current from a converter to the generator of the wind turbine. For instance, the generator angular position may be used by the converter that drives the generator. The generator angular position may be used to control speed and torque of the generator. The generator angular speed may be used by linear actuation control (LAC) speed controllers for full load pitch control or partial load power control of the wind turbine. The generator angular speed may also be used for damping control of a drivetrain of the wind turbine.

Wind turbine control functions such as the functions mentioned above have a direct impact on the loading experienced by various wind turbine components and their lifespan. It is therefore important that an accurate determination of the generator angular position and speed may be obtained for use by various wind turbine control functions.

Imperfections or distortions associated with the encoder sensor of a wind turbine generator shaft can lead to disturbances in the sensor output signal and therefore inaccuracies in the determination of generator angular position and speed. For instance, using a position signal with such imperfections can degrade the response of a field oriented control (FOC) method used for controlling the speed and torque of the wind turbine generator. In particular, a FOC current controller needs accurate generator position tracking to properly control torque and flux components of the generator.

Previous approaches for removing signal distortions associated with encoder imperfections as part of a generator shaft angular speed determination can cause phase shifts in the signal, leading to instabilities. These previous approaches are not suitable for use in the lower speed range of high-speed generators, or with medium speed generators. There is therefore a need for a different approach for the accurate determination of generator angular position and speed using an encoder sensor.

It is against this background to which the present invention is set.

SUMMARY OF THE INVENTION

According to an aspect of the invention there is provided a method for determining angular position of a generator shaft of a wind turbine. The method comprises receiving a position signal, from an encoder position sensor of the wind turbine, indicative of an angular position of the generator shaft. The method comprises determining a compensation signal to compensate for a disturbance signal in the received position signal indicative of an imperfection associated with the encoder position sensor, and modifying the position signal by applying the determined compensation signal to the received position signal to determine angular position.

Therefore, oscillations in a signal received from an encoder that are caused by imperfections associated with the encoder are advantageously dampened, or compensated for, in the position domain. This is in contrast to previous approaches, where such imperfections are dealt with in the speed domain. This provides a (modified) position signal that can be used for accurate control of wind turbine functions that use the generator position signal, e.g. FOC for generator speed and position control. This also allows for determination of a generator speed signal (derived from the modified position signal), that does not include distortions or oscillations from encoder imperfections, to be used in wind turbine control functions where such a signal is needed.

Determining the compensation signal may comprise determining a position component of the position signal. Determining the compensation signal may comprise determining a speed signal based on the position signal, and determining a speed component associated with the disturbance signal in the speed signal. Determining the compensation signal may comprise determining a gain of the compensation signal based on the position component and the speed component.

Determining the speed component may comprise applying a band pass filter to the speed signal. The band pass filter may have a centre frequency equal to a frequency of the disturbance signal.

Determining the position component may comprise identifying a sine position component in the position signal, and identifying a cosine position component in the position signal. Determining the gain of the compensation signal may comprise determining a sine component gain which comprises multiplying the sine position component and the speed component, and determining a cosine component gain which comprises multiplying the cosine position component and the speed component.

Determining the sine and cosine component gains may comprise applying a disturbance signal filtering function to signals obtained from the respective multiplication steps. The disturbance signal filtering function may include at least one of a low pass filter and an integrator.

The compensation signal may include first and second compensation components. The first compensation component may be determined by multiplying sine position component and the cosine component gain. The second compensation component may be determined by multiplying cosine position component and the sine component gain.

The compensation signal may be determined by minimising a cross correlation between the position components and the speed components of the frequency of the disturbance signal as part of an adaptive control loop.

The adaptive control loop may be a mixed feedback and forward adaptive control loop.

The position components may be determined from the received position signal as part of a feedforward step of the adaptive control loop. The speed signal may be determined from the modified position signal as part of a feedback step of the adaptive control loop.

The adaptive control loop may be a feedback control loop in which the position components and the speed signal are determined from the modified position signal.

The adaptive control loop may be a feedforward control loop in which the position components and the speed signal are determined from the received position signal.

The disturbance signal may correspond to at least one of: mechanical outrun associated with an alignment error of the encoder position sensor and having a frequency corresponding to a mechanical speed of the generator; and, ovality distortion associated with a physical deformation of the encoder position sensor and having a frequency corresponding to twice the mechanical speed of the generator.

The method may comprise determining a control action for controlling the wind turbine in dependence on the determined angular speed. Optionally, the control action is for controlling at least one of: a current from a converter of the wind turbine to the generator; and, a pitch angle of one or more rotor blades of the wind turbine. Optionally, the method comprises transmitting a control signal to control one or more components of the wind turbine in dependence on the determined control action.

According to another aspect of the present invention there is provided a controller for a wind turbine. The controller is configured to receive a position signal, from an encoder position sensor of the wind turbine, indicative of an angular position of a generator shaft of the wind turbine. The controller is configured to determine a compensation signal to compensate for a disturbance signal in the received position signal indicative of an imperfection associated with the encoder position sensor, and modify the position signal by applying the determined compensation signal to the received position signal to determine angular position.

According to another aspect of the present invention there is provided a wind turbine comprising the controller described above.

According to another aspect of the invention there is provided a non-transitory, computer-readable storage medium storing instructions thereon that when executed by one or more processors cause the one or more processors to execute the method described above.

BRIEF DESCRIPTION OF THE DRAWINGS

Examples of the invention will now be described with reference to the accompanying drawings, in which:

FIG. 2(a) illustrates a mechanical outrun imperfection, and FIG. 2(b) illustrates an ovality distortion;

DETAILED DESCRIPTION

The present invention generally relates to determining the angular position (and optionally speed) of a generator shaft of a wind turbine based on an encoder sensor position signal. In particular, the invention provides a method for compensating for distortions in the position signal caused by imperfections in the encoder sensor so as to improve the accuracy of the angular position and/or speed determinations that may then be used in various wind turbine control functions.

Figure 1:
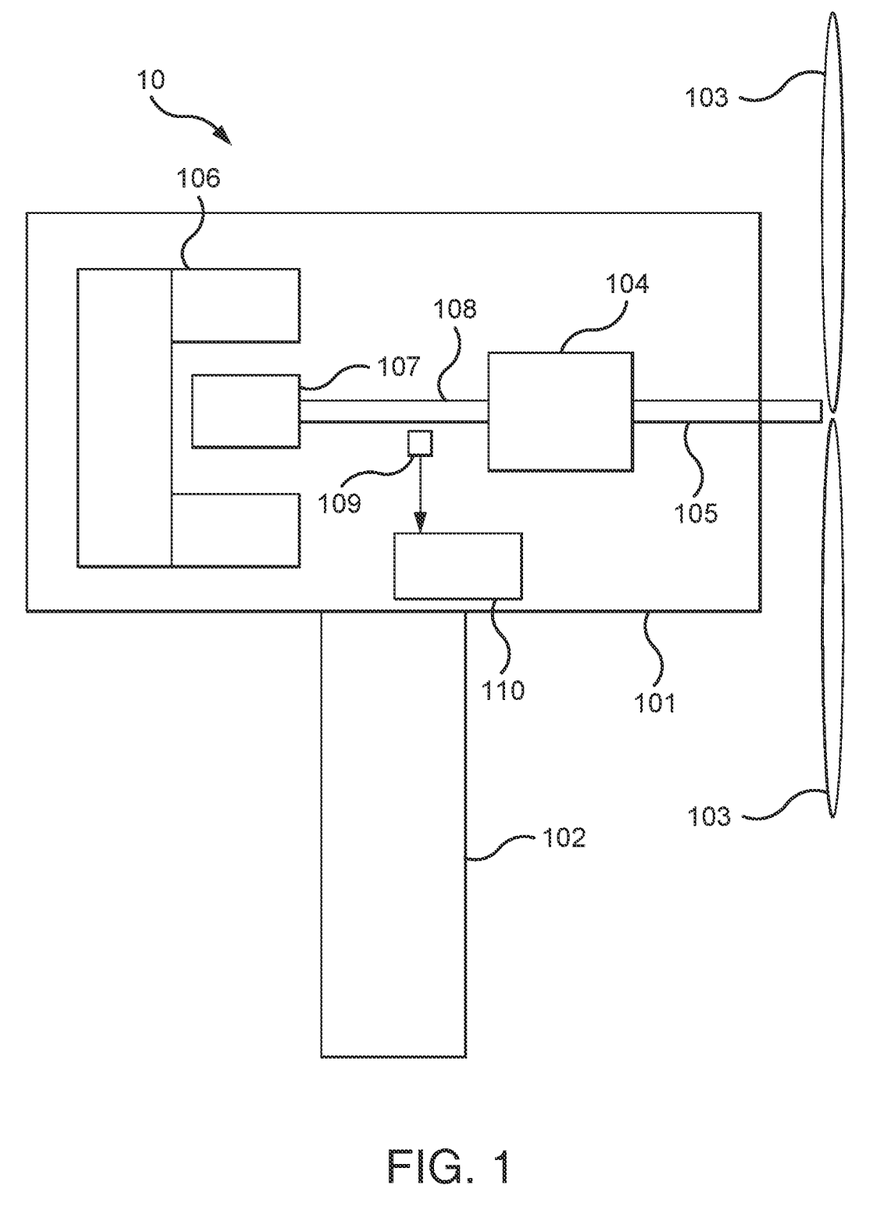
FIG. 1 schematically illustrates a wind turbine including an encoder sensor for measuring a position of a shaft of the wind turbine, and including a controller in accordance with an example of the invention.

FIG. 1 schematically illustrates a wind turbine 10 in accordance with an example of the invention. The wind turbine 10 includes a nacelle 101 atop a tower 102, and a plurality of rotor blades 103 (typically, three) mounted to a rotor. The nacelle 101 houses a number of wind turbine components. In particular, a gearbox 104 is connected to the rotor by a rotor shaft 105, and connected to a generator—comprising a stator 106 and rotor 107—by a generator shaft 108.

The wind turbine 10 includes an encoder sensor 109 (or simply, encoder) associated with the generator shaft 108. The encoder 109 is for measuring a position of the generator shaft 108. In particular, the encoder 109 is a rotary encoder for monitoring the rotational motion of the generator shaft 108. The encoder 109 may detect changes in a magnetic position or magnetic field to provide an output representative of a positional change in the shaft 108. The output may be in the form of repetitive pulses that may be counted to accumulate total motion.

The wind turbine 10 includes a controller 110 in accordance with an example of the invention. The illustrated example shows the controller 110 housed in the nacelle 101; however, the controller 110 may be located elsewhere in the wind turbine 10 in different examples. Alternatively, the controller 110 may be remote from the wind turbine 10 in further different examples. The controller 110 is configured to receive output signals from the encoder 109 indicative of a position of the generator shaft 108 as it rotates about its axis. This may be in the form of a pulse signal where the pulses are counted to determine an angular position of the generator shaft 108. The processing performed by the controller 110 will be described in greater detail below.

The controller 110 may be in the form of any suitable computing device, for instance one or more functional units or modules implemented on one or more computer processors. Such functional units may be provided by suitable software running on any suitable computing substrate using conventional or customer processors and memory. The one or more functional units may use a common computing substrate (for example, they may run on the same server) or separate substrates, or one or both may themselves be distributed between multiple computing devices. A computer memory may store instructions for performing the methods performed by the controller, and the processor(s) may execute the stored instructions to perform the method.

It will be appreciated that the nacelle 101 houses further components not shown in FIG. 1, e.g. electrical equipment including a converter that provides current to the generator 106, 107.

Figure 2:
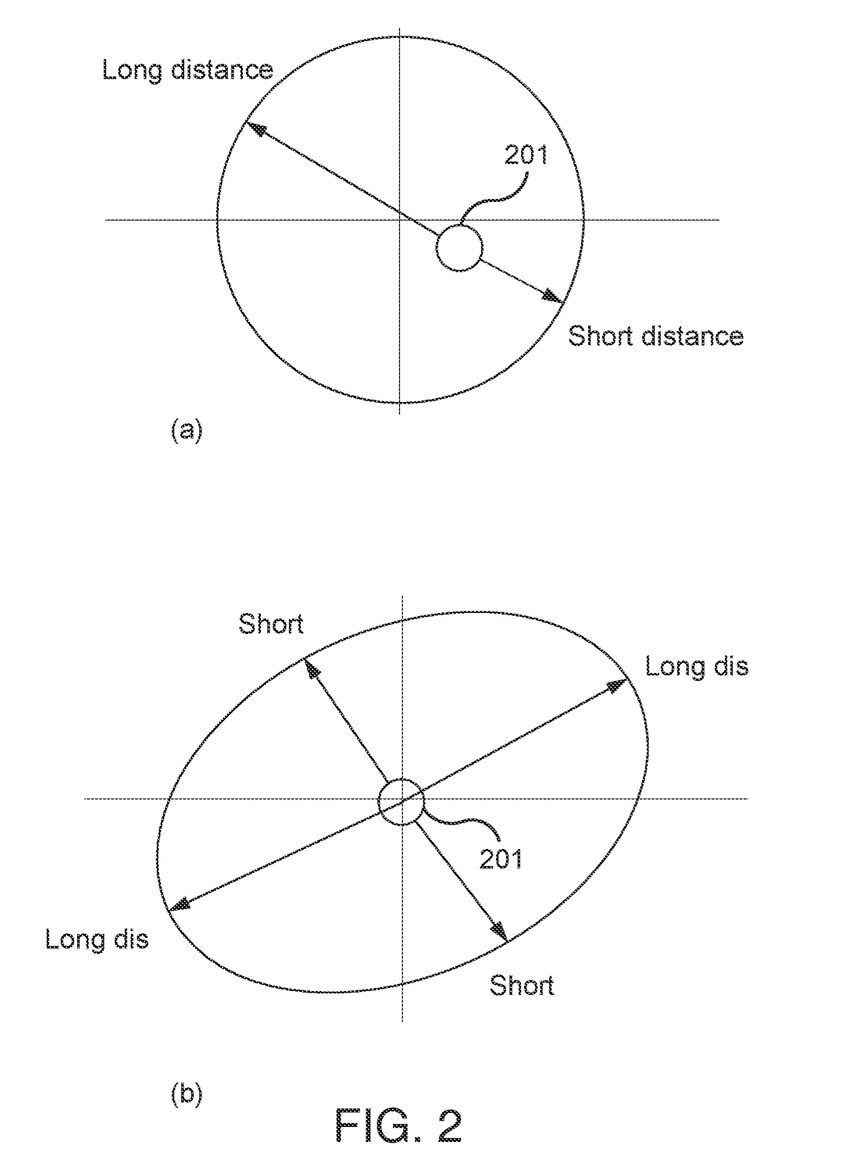
FIG. 2 schematically illustrates imperfections associated with the encoder sensor of FIG. 1 that cause distortions in a signal from the encoder sensor received by the controller of FIG. 1; in particular.

Imperfections or distortions associated with the encoder sensor of a wind turbine generator shaft can lead to disturbances in the sensor output signal and therefore inaccuracies in the determination of generator angular position and speed. For an accurate measurement to be made, an encoder should be centred relative to an axis of rotation of the generator shaft. An error or disturbance in the encoder measurement therefore occurs if the encoder is misaligned relative to the centre of the generator shaft. This disturbance may be referred to as mechanical outrun or centricity, and occurs at the same frequency as the mechanical speed of the generator. FIG. 2(*a*) schematically illustrates an example in which an encoder is misplaced relative to the centre of a generator shaft, i.e. the generator shaft axis of rotation 201. That is, the imperfection in the encoder is that it is not centred correctly relative to the generator shaft axis of rotation 201. As the generator shaft rotates, this will lead to a disturbance or distortion in the output signal of the encoder that occurs at the same frequency as the mechanical speed with locked phase. This may be referred to as the generator 1P frequency.

A physical deformation in the encoder is another imperfection of the encoder that can lead to a disturbance in the sensor output measurement. This disturbance may be referred to as ovality, and occurs at a frequency twice that of the mechanical speed of the generator with locked phase. FIG. 2(*b*) schematically illustrates an example in which the encoder tracks a generally oval shape as the generator shaft rotates about its axis 201, meaning that the pattern repeats twice for each rotation. This may therefore be referred to as generator 2P frequency.

In previous methods, a low pass phase locked loop (PLL) function may be used for calculating generator angular speed from an encoder sensor output signal. One or more band stop or notch filters inside the closed loop filter or PLL function may be used to remove, or compensate for, oscillations in the signal at frequencies corresponding to sensor imperfections such as those mentioned above (i.e. generator 1P, 2P frequencies). However, these previous methods make the general tuning of a generator position and speed dynamic response difficult. That is, the tuning of the compensation for encoder imperfections is relatively complex and degrades the response of generator control. This is because the overall dynamic response is dependent on the design of the particular generator under consideration. In particular, compensating for encoder imperfections using previous methods can lead to relatively significant phase shifts in the signal, resulting in instabilities. Specifically, the bandwidth of the position tracking may become so low that current control to the generator becomes unstable.

This is a particular problem when the mechanical frequency of the generator is significantly less than the electrical frequency. In high-speed generators, this compensation approach therefore needs to be disabled in the lower speed range, i.e. lower values of the mechanical frequency. Furthermore, this compensation approach is not suitable for use with medium speed generators (where the mechanical frequency may always be significantly less than the electrical frequency). In one illustrative example, a medium speed generator has a relatively high number of pole pairs, such as 18 pole pairs. In this particular, therefore, the mechanical speed is 18 times lower than the electrical speed, meaning that the previous approaches for determining generator shaft would suffer from instabilities as outlined above.

The present invention is advantageous in that a more accurate determination of generator shaft angular position, and optionally angular speed, is obtained relative to previous, known methods. This is achieved by applying an encoder imperfection compensation signal to the position signal received from the encoder, and then modifying the position signal based on the compensation signal to remove distortions or oscillations caused by encoder imperfections. This contrasts with previous methods, in which band stop filters are incorporated inside a closed loop of an encoder filter for determining angular speed. That is, in the present invention the compensation is determined and applied in the position domain rather than in the speed domain as in previous approaches. In this way, the invention decouples encoder filter tuning and encoder imperfection compensation, i.e. compensation for low-level mechanical outrun, ovality, etc. The generator speed may then be derived from the (modified) position signal, such that the determined generator speed also does not include oscillations resulting from encoder imperfections.

The present invention is therefore advantageous in that the encoder filter tuning becomes independent of the number of pole pairs in the generator and the speed range of the generator. In particular, encoder filter tuning will relate only to current control performance requirements. Also, the present invention may be applied and optimised for all types of generators and encoders. Furthermore, as the encoder imperfection compensation is locked to the mechanical domain, it will only compensate for mechanical distortion. That is, the invention will not (erroneously) compensate for true speed oscillation of the generator speed.

The present invention therefore provides for more accurate and appropriate control of wind turbine functions that use the generator shaft angular position and/or angular speed determination based on the encoder output signal. For instance, functions such as full load pitch control, partial load power control, generator speed/torque control using FOC, and drive train damping control of a wind turbine may be improved, in particular by minimising component loading to increase component lifespan.

Figure 3:
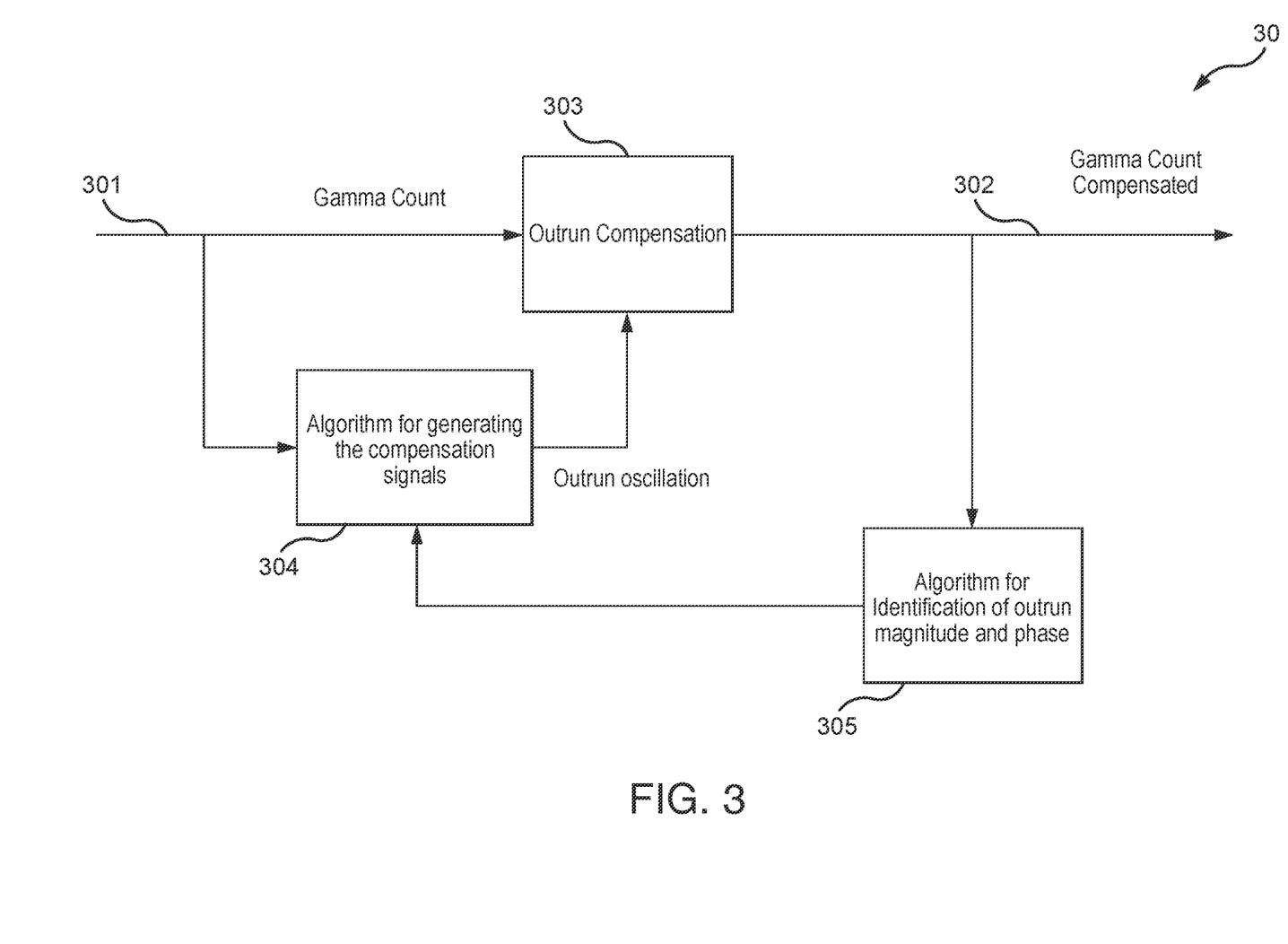
FIG. 3 illustrates control blocks of a control scheme performed by the controller of claim 1.

FIG. 3 schematically illustrates a control scheme 30 implemented by the controller 110 in accordance with an example of the invention. The position signal 301 from the encoder 109 is received by the controller 110. The specification of the encoder 109 itself will define the resolution and precision of the measured rotor position. There may be low-level software interfacing with the encoder 109 that counts the received number of pulses, and resets the count one time per rotation of the generator shaft. As indicated in FIG. 3, the controller 110 may therefore receive the encoder position signal in the form of a raw pulse count or Gamma count. This position signal is indicative of an angular position of the generator shaft 108.

Whereas in previous approaches, this raw position signal 301 would be provided to a low pass phase-locked loop function (or transfer function low pass filter) to determine the angular speed of the generator shaft, in the described method a compensated or modified signal 302 (Gamma count compensated signal) is provided to a control function that uses generator position signal as an input, and/or a control block for determining the angular speed of the generator shaft 108. In particular, a compensation signal is applied to the position signal 301 at control block or module 303 to obtain the modified signal 302. Specifically, the compensation signal is for modifying the raw position signal 301 to compensate for distortions in the raw position signal caused by imperfections in the encoder sensor 109. In the example illustrated in FIG. 3, the control block 303 is for obtaining a modified signal 302 that compensates for mechanical outrun caused by a misalignment of the encoder 109 relative to the axis of the generator shaft 108. However, the control block 303 can be used for compensating to account for different or additional distortions caused by encoder imperfections, e.g. ovality.

The high-level architecture 30 illustrated in FIG. 3 indicates that the described example uses an adaptive mixed feedforward and feedback loop to compensate for mechanical outrun in the raw position signal 301 from the encoder 109. In particular, the raw position signal 301 is provided to a control block 304 as part of a feedforward loop. The control block 304 is for generating or determining the compensation signal that will be provided to the control block 303 to be applied to the position signal 301 so as to obtain the modified position signal 302. In addition to receiving the feedforward position signal 301, the compensation signal module 304 also receives a feedback signal from a further control block 305. As shown in FIG. 3, the control block 305 receives as input the modified position signal 302 obtained from the control block 303, and this is analysed to identify the phase and magnitude of the signal distortion caused by the encoder imperfection, e.g. the component of the signal indicative of mechanical outrun. As mentioned, this is then provided to the compensation signal module 304, which determines an oscillation signal having a determined phase and magnitude to counteract the outrun oscillation in the raw position signal 301.

Figure 4:
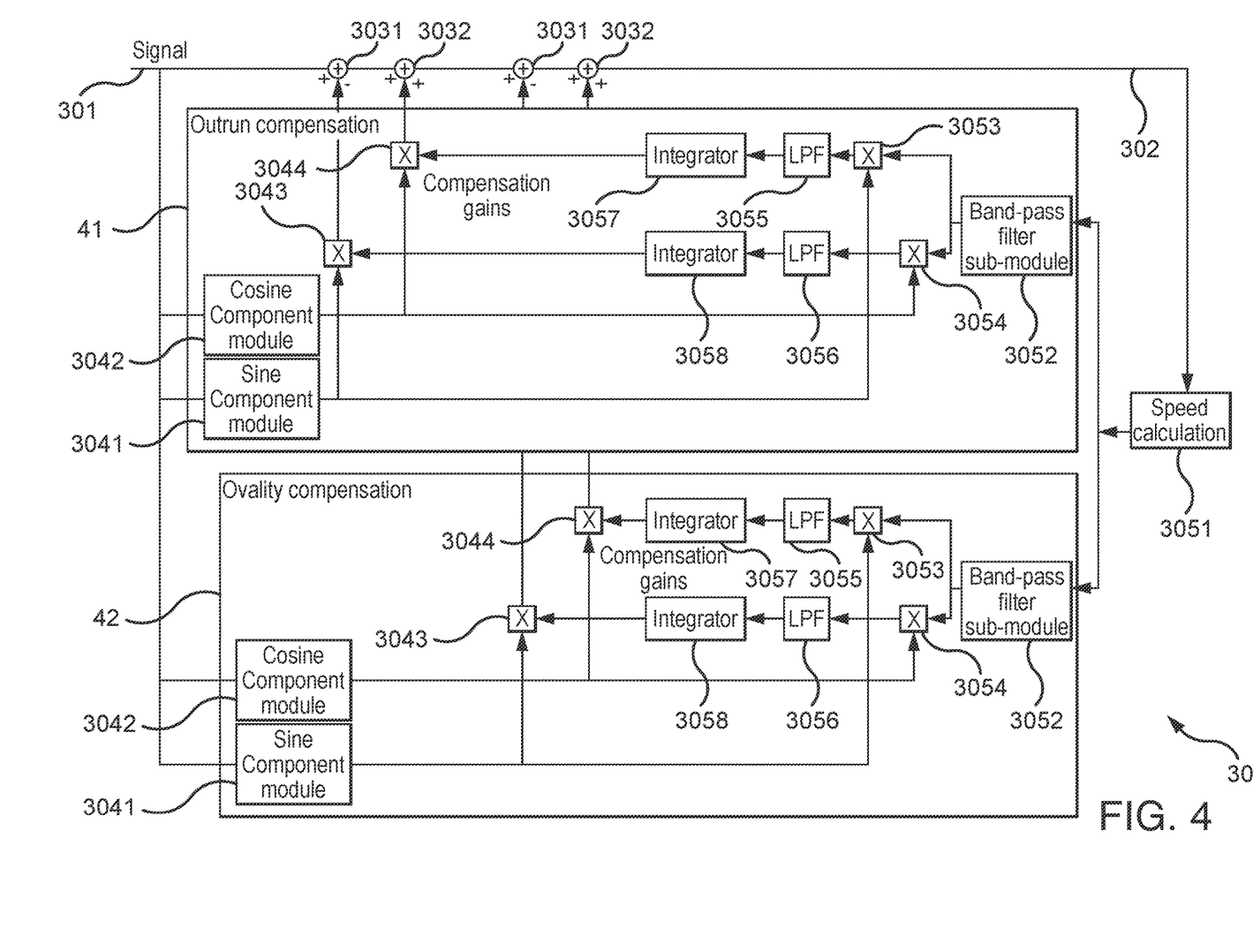
FIG. 4 illustrates the control scheme of FIG. 3, including sub-blocks of the control blocks shown in FIG. 3.

FIG. 4 illustrates a more detailed view of the high-level mixed feedforward and feedback control scheme or loop 30 of FIG. 3. FIG. 4 also illustrates a more generalised version of the control scheme, as it provides for compensating both mechanical outrun and ovality in a position signal 301 received from the encoder 109. It will be understood that the control scheme can be further generalised to compensate for distortions in the position signal caused by further/different encoder imperfections. While the described examples target generator 1P (outrun) and 2P (ovality) frequencies, distortions at other generator frequencies (3P, 4P, etc.) may equally be compensated for in a corresponding manner.

A first part 41 of the control loop architecture 30 relates to the determination of a compensation signal to compensate for mechanical outrun distortion in the raw position signal. A second part 42 of the control loop architecture 30 relates to the determination of a compensation signal to compensate for ovality distortion in the raw position signal.

Referring to the first, outrun part 41 of the architecture 30, the raw position signal 301 from the encoder 109 is fed forward to the outrun compensation module 304. As illustrated in FIG. 4, this module 304 includes two sub-modules, namely a sine-component module 3041 and a cosine-component module 3042. In particular, the sine-component module 3041 receives the Gamma count 301 and identifies or extracts the sine component of the signal 301. Similarly, the cosine-component module 3042 receives the Gamma count 301 and identifies or extracts the cosine component of the signal 301. These components are then provided from the sub-modules 3041, 3042 to further sub-modules or blocks 3043, 3044 of the compensation signal module 304, as will be discussed below.

Still referring to the first, outrun part 41 of the architecture 30, the modified or compensated signal 302 is provided as feedback to the outrun part 41 for the purpose of identifying the compensation gains that are to be applied to the compensation signals determined in the sub-modules 3041, 3042. In particular, the control module 305 includes a speed calculation sub-module 3051. Specifically, the compensated signal 302 is received by the speed calculation sub-module 3051, which uses this received signal 302 to calculate the angular speed, e.g. by differentiating the received signal 302. This angular speed is then provided to a further sub-module 3052, which applies a band-pass filter having a centre frequency equal to outrun oscillations (i.e. 1P). This results in a filtered speed signal that has only the outrun frequency. That is, the speed calculation is used to define the centre frequency of the band-pass filter, which will be used to identify the frequencies of the distortions under consideration.

As indicated in FIG. 4, the filtered speed signal is multiplied with the sine and cosine components obtained in sub-modules 3041, 3042 in respective sub-modules 3053, 3054. Each of the resulting signals—which may be referred to as correlation signals—are then processed by respective low-pass filter sub-modules 3055, 3056 and integrator sub-modules 3057, 3058. The obtained signals are respective (sine and cosine) compensation gains that are multiplied with the cosine and sine position components obtained from the sub-modules 3041, 3042 in the sub-modules 3043, 3044. Note that, as shown in FIG. 3, it is the speed multiplied by the cosine position component that is used as the gain for the sine component of the compensation signal. Correspondingly, it is the speed multiplied by the sine position component that is used as the gain for the cosine component of the compensation signal. In this way, these are 'cross-correlation' signals. Note also that the feedback loop to identify the gains automatically finds both the phase and magnitude of the distortion signal (in this case, outrun). The output of the sub-modules 3043, 3044 are the compensation signals to be applied to the raw position signal 301 to compensate for mechanical outrun in the raw position signal 301. Indeed, the compensation signals are combined/added to the raw position signal 301 in the module 303 (in particular, at the sub-modules 3031, 3032).

The second, ovality part 42 of the architecture 30 has a corresponding structure to the first, outrun part 41, except that the resulting compensation signal is to compensate for ovality distortion in the raw position signal 301 (rather than outrun distortion). Sub-modules in the ovality part 42 performing like functions as in the outrun part 41 have been labelled with the same reference numerals. In the sine- and cosine-component modules 3041, 3042 of the ovality part 42, the sine and cosine functions, respectively, are applied to two times the Gamma count (position signal) 301. This is because the ovality distortion has 2P frequency. Note that as the outrun distortion has 1P frequency then in the corresponding sub-modules 3041, 3042 of the outrun part 41 the sine and cosine functions are applied directly to the Gamma count (position signal) 301 (i.e. 'one times the Gamma count').

Similarly, in the band-pass filter sub-module 3052 of the ovality part 42, instead of the applied band-pass filter having a centre frequency equal to outrun oscillations (i.e. 1P) as in the outrun part 41, it has a centre frequency equal to ovality oscillations (i.e. 2P). As such, this results in a filtered speed signal in the ovality part 42 that has only the ovality frequency.

In general, the aim of the adaptive control algorithm architecture 30 is to minimise a cross correlation of encoder distortion frequency (i.e. outrun and/or ovality frequency) between speed and position. The mixed feedforward and feedback adaptive loop may be regarded as providing a particularly robust method for compensating for encoder imperfections.

In the example illustrated in FIGS. 3 and 4, a determination of angular speed (based on the modified position signal 302) to be provided to control functions where generator speed is an input may be separate from the determination of angular speed in the speed calculation sub-modulation 3051. In different examples, however, a single determination of angular speed based on the modified position signal 302 may be performed, where the obtained angular speed is both: provided for use in performing one or more control functions of the wind turbine; and, provided as feedback to a distortion phase and magnitude module for determining encoder imperfection compensation signals.

Figure 5A:
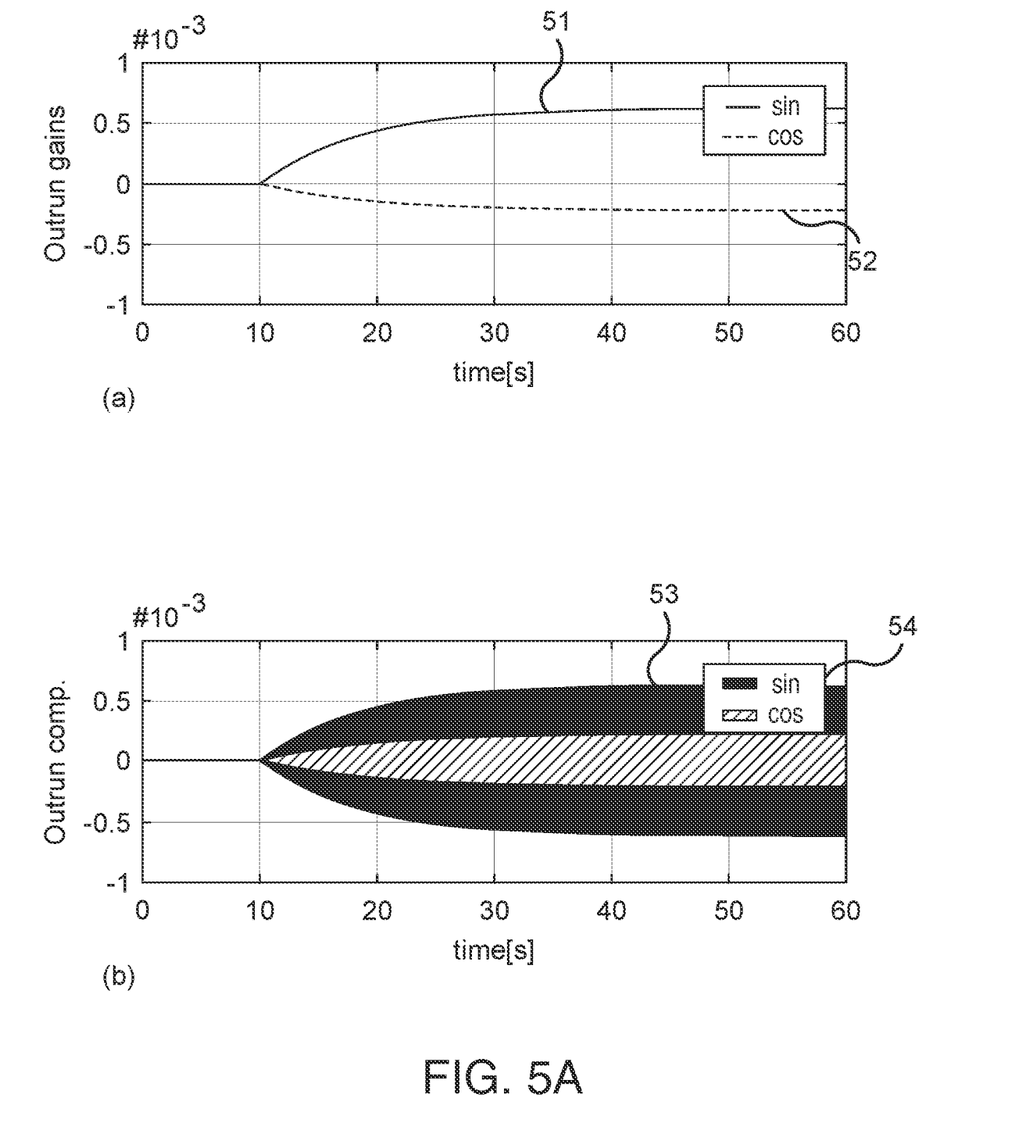
FIGS. 5A and 5B show illustrative plots of results obtained when the controller of FIG. 1 implements the control scheme of FIG. 3 to compensate for mechanical outrun as shown in FIG. 2(a)
Figure 5B:
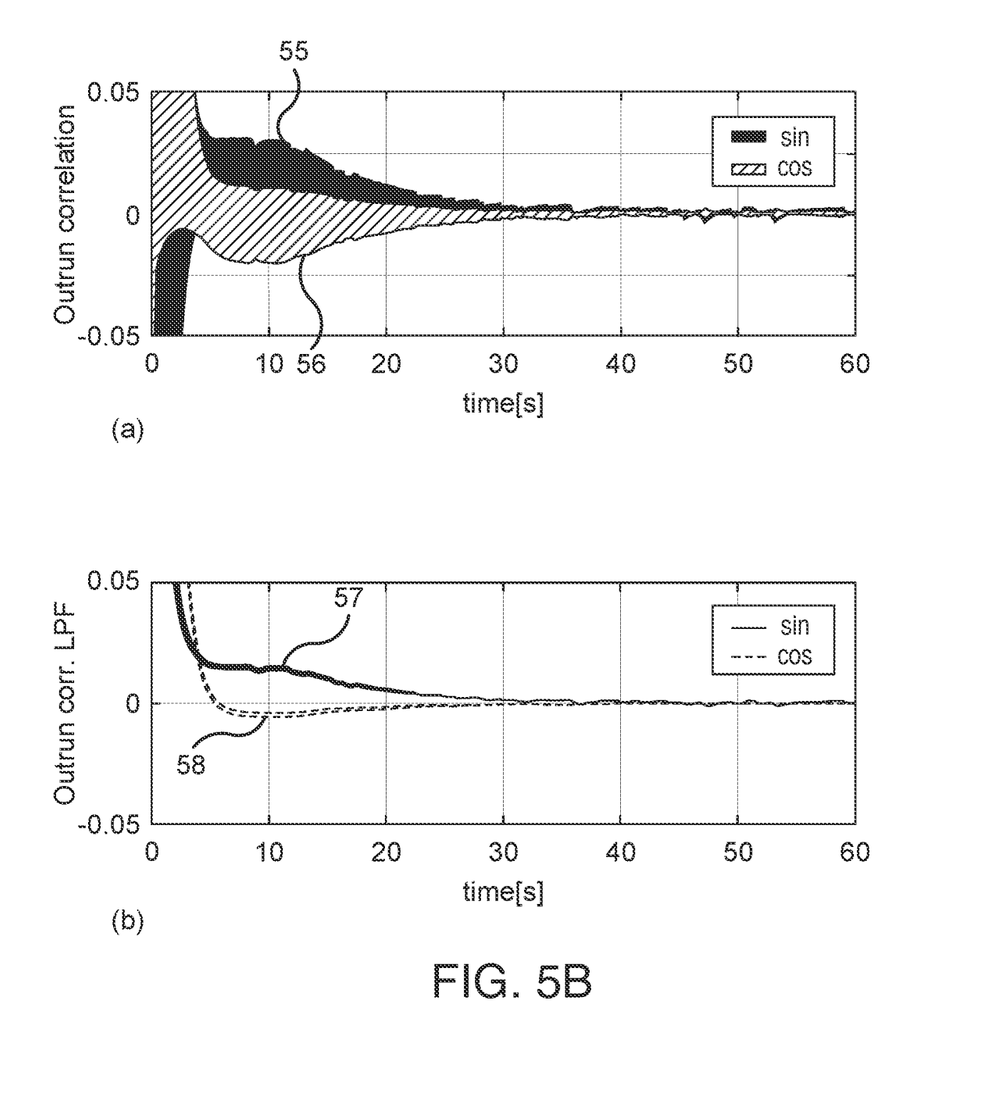
Figure 6A:
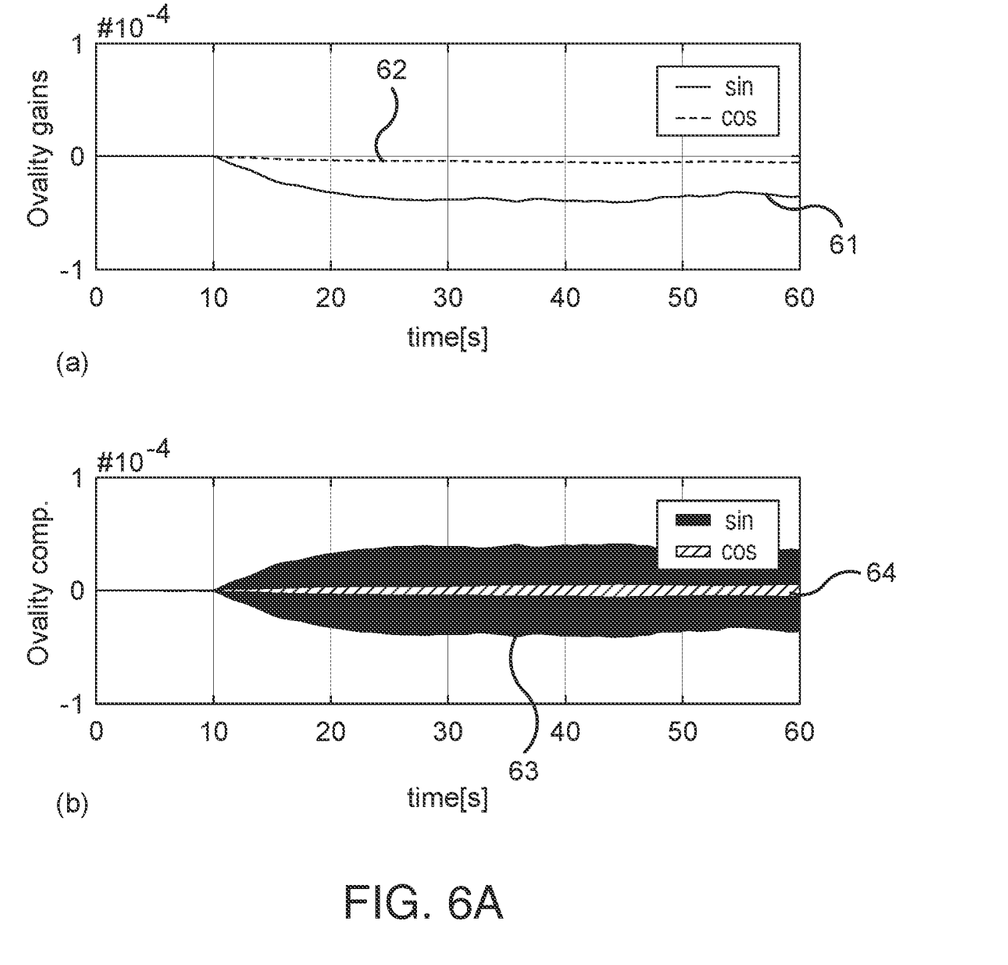
FIGS. 6A and 6B show illustrative plots of results obtained when the controller of FIG. 1 implements the control scheme of FIG. 3 to compensate for ovality distortion as shown in FIG. 2(b)
Figure 6B:
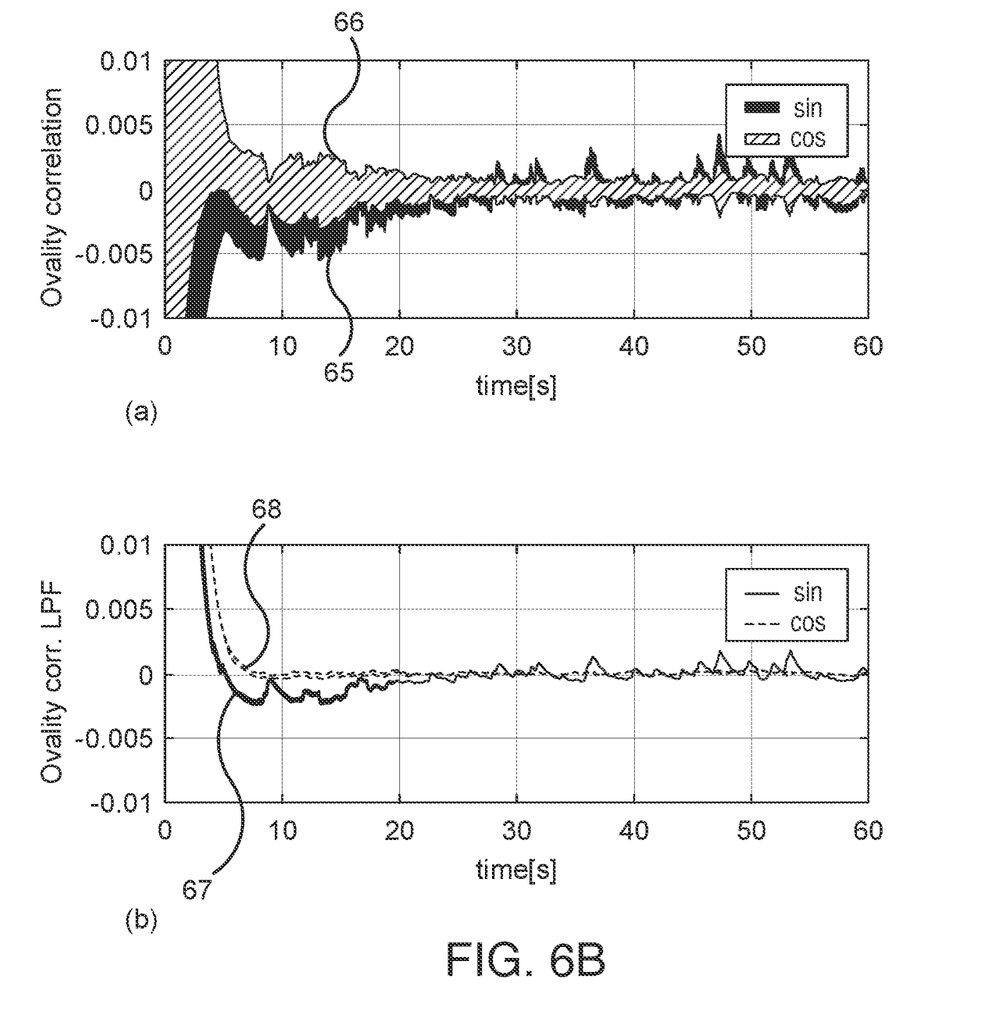

FIGS. 5A and 5B plots of simulation results obtained when the described method is used to compensate for mechanical outrun in an output signal, received from the encoder 109, indicative of the angular position of the generator shaft 108. The results relate to a steady state speed of 440 rpm, with an outrun position sine component of 0.006 and an outrun position cosine component of 0.0025. In particular, FIG. 5 shows plots of parameters illustrating how the method identifies, and compensates for, the mechanical outrun distortion over time. FIG. 5A(a) shows the sine and cosine gain components 51, 52, FIG. 5A(b) shows the sine and cosine compensation components 53, 54, FIG. 5B(c) shows the sine and cosine correlation components 55, 56, and FIG. 5B(d) shows the low-pass filtered sine and cosine correlation components 57, 58. It may be seen that the gains and compensation signals converge to optimum values over time while the cross-correlation signals are minimised. FIGS. 6A and 6B show corresponding plots to those shown in FIGS. 5A and 5B simulation results obtained when the described method is used to compensate for ovality distortion, where parameters are indicated by reference numerals 61-68 (in a corresponding manner to reference numerals 51-58 in FIGS. 5A and 5B).

Figure 7:
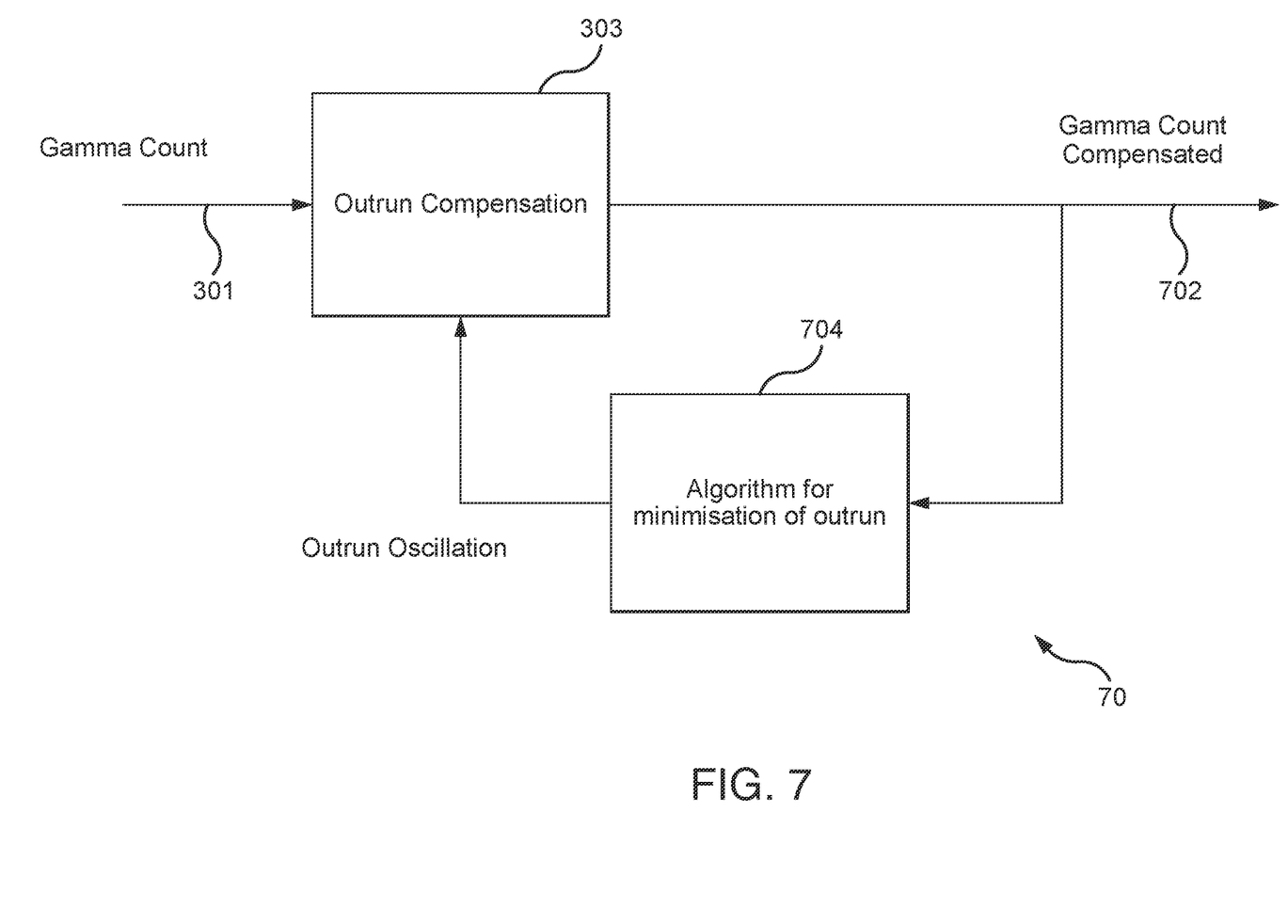
FIG. 7 illustrates control blocks of an alternative control scheme to the control scheme of FIG. 3, performed by the controller of claim 1.

FIG. 7 schematically illustrates an alternative control scheme 70 (relative to the control scheme 30 of FIG. 3) that may implemented by the controller 110 in accordance with an example of the invention. Unlike in FIG. 3, which describes a mixed feedforward and feedback adaptive control loop, the control scheme 70 of FIG. 7 is a purely feedback adaptive control loop for modifying the raw position signal 301 to obtain the modified/compensated position signal 302 that compensates for one or more encoder imperfections (e.g. outrun, ovality). That is, like in FIG. 3, the identification of gains in the scheme 70 of FIG. 7 is based on a feedback loop using the modified position signal 302 (in particular, based on the calculated angular speed). However, unlike in FIG. 3, the compensation signal in the scheme 70 of FIG. 7 is also based on a feedback loop using the modified position signal 302. This feedback loop is represented as a single control block 704 to determine the compensation signal, which is then applied to the position signal 301 at control block 303 to obtain the modified position signal 302.

Figure 8:
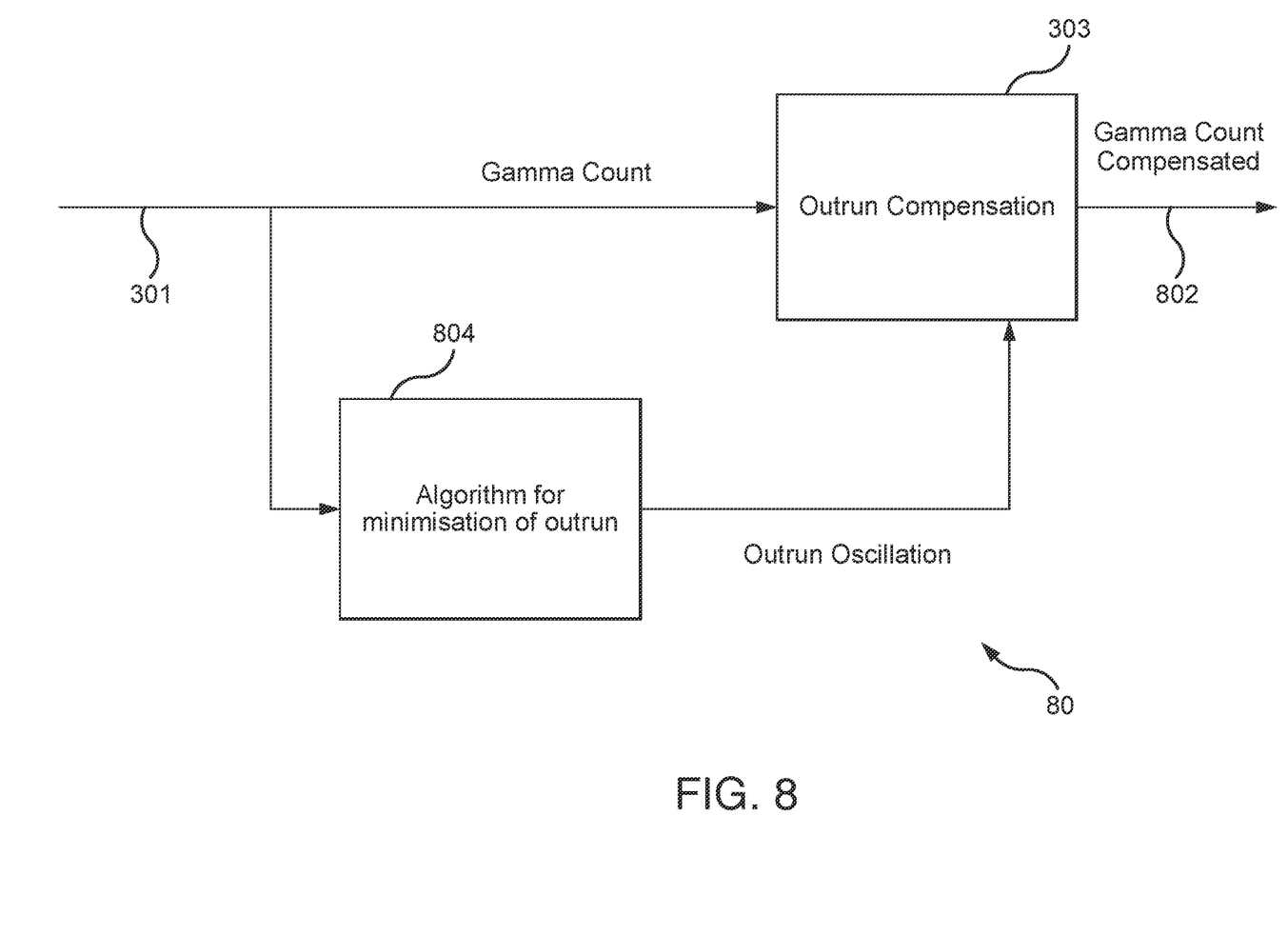
FIG. 8 illustrates control blocks of a further alternative control scheme to the control scheme of FIG. 3, performed by the controller of FIG. 1; and, FIG. 9 shows the steps of a method performed by the controller of FIG. 1 in accordance with an example of the invention.

FIG. 8 schematically illustrates a further alternative control scheme 80 (relative to the control scheme 30 of FIG. 3 and the control scheme 70 of FIG. 7) that may implemented by the controller 110 in accordance with an example of the invention. Unlike in FIGS. 3 and 7, the control scheme 80 of FIG. 8 is a purely feedforward adaptive control loop for modifying the raw position signal 301 to obtain the modified/compensated position signal 302 that compensates for one or more encoder imperfections (e.g. outrun, ovality). Like in FIG. 3, the compensation signal in the scheme 80 of FIG. 8 is based on a feedforward loop using the raw position signal 301. However, unlike in FIG. 3, the identification of gains in the scheme 80 of FIG. 8 is also based on a feedforward loop using the raw position signal 301. In such a loop, the gains may need to be known a priori, rather than them adapting with feedback like in FIGS. 3 and 7. This feedforward loop is represented as a single control block 804 to determine the compensation signal, which is then applied to the position signal 301 at control block 303 to obtain the modified position signal 302.

Figure 9:
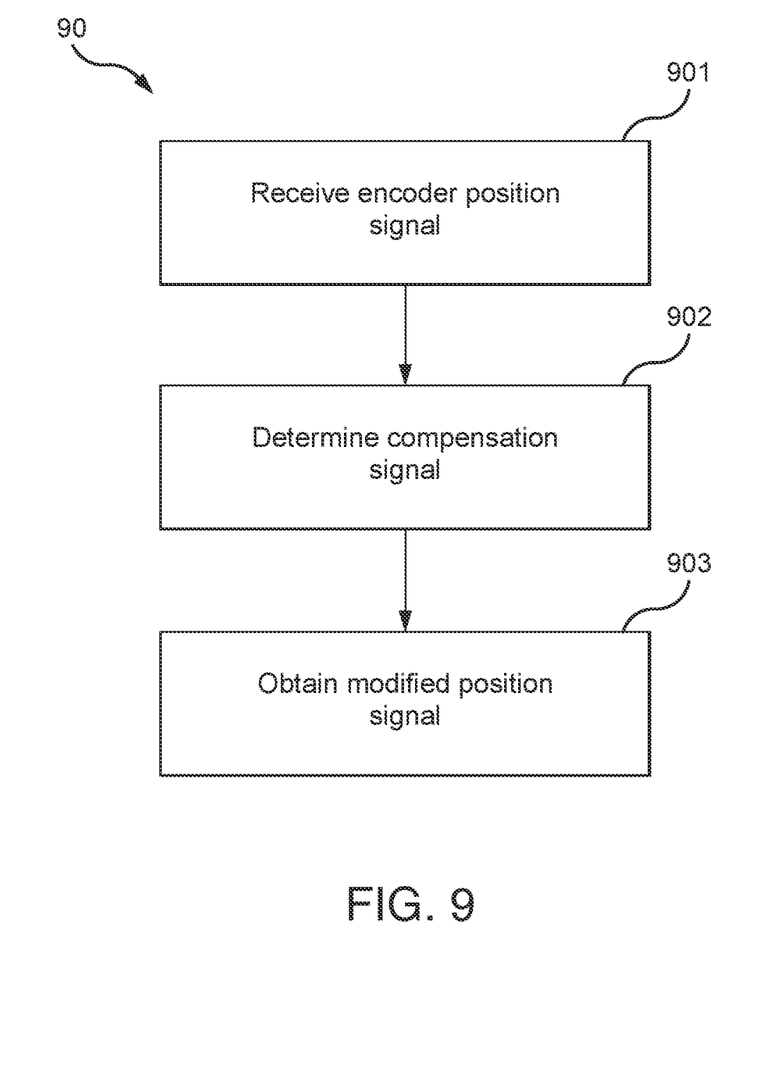

FIG. 9 summarises the steps of a method 90 performed by the controller 110 for determining the angular position, and optionally speed, of the generator shaft 108 of the wind turbine 10. At step 901, the method 90 includes receiving a position signal 301, from an encoder position sensor 109 of the wind turbine 10, indicative of an angular position of the generator shaft 108. The position signal 301 may be in the form of a pulse (Gamma) count signal.

At step 902, the method 90 includes determining a compensation signal to compensate for a disturbance signal in the received position signal indicative of an imperfection associated with the encoder position sensor. This may involve determining a gain of the compensation signal based on determined position and speed components from the position signal, the speed component being associated with the disturbance signal. The position component may include sine and cosine components of the position signal.

At step 903, the method 90 includes modifying the position signal by applying the determined compensation signal to the received position signal. This may involve adding the position and compensation signals together. The compensation signal may include components for compensating for one or more imperfections associated with the encoder sensor. For instance, the compensation signal may include components for compensating for mechanical outrun (1P frequency distortion) and/or ovality distortion (2P frequency distortion) in the position signal. The compensation signal may additionally or alternatively include components for compensating for different types of distortions in the position signal (e.g. 3P frequency distortion, 4P frequency distortion, etc.).

The modified (compensated) position signal may then be provided to one or more control functions of the wind turbine 10 that use a generator position signal as an input. Alternatively, or in addition, a generator speed signal may be determined as a derivative of the modified position signal. The generator speed signal is then optionally provided to one or more control functions of the wind turbine 10 that use a generator speed signal as an input.

Such control functions may determine a control action for controlling the wind turbine 10 in dependence on the determined angular position and/or speed of the generator shaft 108. For instance, the control action could be for controlling the current from a converter of the wind turbine 10 to the generator 108, or controlling a pitch angle of the rotor blades 103. Indeed, the method may include transmitting a control signal to a control component (e.g. a pitch actuator component for adjusting blade pitch) of the wind turbine 10 in accordance with the determined control action.

The determination of generator shaft angular position and/or speed may also be used as part of a predictive maintenance scheme associated with the wind turbine 10. In particular, if the encoder 109 fails then the wind turbine 10 may not be able to continue operation. As such, if the analysis of the method described herein can predict that an encoder is not functioning properly or will fail ahead of actually doing so, then this can minimise potential down time of the wind turbine. In one example, if the distortion caused by encoder imperfections (e.g. outrun, ovality, etc.) in the position signal are outside of agreed tolerances then a warning signal may be raised. The encoder may then be checked to identify whether there is a hardware issue, e.g. a screw is loose, that is causing the relatively high distortion levels. The warning signal may indicate that the encoder should be checked immediately or when the wind turbine 10 is undergoing its next scheduled service. If the distortion levels are particularly high, then operation of the wind turbine 10 may be stopped until the issue is identified and corrected.

Many modifications may be made to the described examples without departing from the scope of the appended claims.

Although in the examples above it is the angular position and speed of a wind turbine generator shaft that is determined, it will be understood that the described method is also applicable for determining the angular position and speed of a different rotating component. For instance, the described method may be used to determine the angular position and/or speed of the rotor shaft. The described method may also be used to determine the angular position and/or speed of any suitable rotating component having an encoder for monitoring its position and providing output pulses indicative of its position.

The invention claimed is:

1. A method for determining angular position of a generator shaft of a wind turbine, the method comprising:
   receiving a position signal, from an encoder position sensor of the wind turbine, indicative of an angular position of the generator shaft;
   determining a position component of the position signal by (i) identifying a sine position component in the position signal and (ii) identifying a cosine position component in the position signal;
   determining a speed signal based on the position signal;
   determining, in the speed signal, a speed component associated with a disturbance signal in the position signal and indicative of an imperfection associated with the encoder position sensor;
   determining a gain by (i) determining a sine component gain which comprises multiplying the sine position component and the speed component and (ii) determining a cosine component gain which comprises multiplying the cosine position component and the speed component;
   determining, by a processor, a compensation signal with the determined gain to compensate for the disturbance signal;
   modifying, by the processor, the position signal by applying the determined compensation signal to the received position signal to determine angular position; and
   adjusting a current from a converter of the wind turbine or a pitch angle of a rotor blade of the wind turbine based on the determined angular position.

2. The method of claim 1, wherein determining the speed component comprises applying a band pass filter to the speed signal, the band pass filter having a centre frequency equal to a frequency of the disturbance signal.

3. The method of claim 1, wherein determining the sine and cosine component gains comprises applying a disturbance signal filtering function to signals obtained from the respective multiplication steps, the disturbance signal filtering function including at least one of a low pass filter and an integrator.

4. The method of claim 1, wherein the compensation signal includes first and second compensation components, wherein the first compensation component is determined by multiplying the sine position component and the cosine component gain, and wherein the second compensation component is determined by multiplying the cosine position component and the sine component gain.

5. The method of claim 4, wherein the compensation signal is determined by minimising a cross correlation between position components and speed components of a frequency of the disturbance signal as part of an adaptive control loop.

6. The method of claim 5, wherein the adaptive control loop is a mixed feedback and forward adaptive control loop.

7. The method of claim 6, wherein:
   the position components are determined from the received position signal as part of a feedforward step of the adaptive control loop; and
   the speed signal is determined from the modified position signal as part of a feedback step of the adaptive control loop.

8. The method of claim 5, wherein the adaptive control loop is a feedback control loop in which the position components and the speed signal are determined from the modified position signal.

9. The method of claim 5, wherein the adaptive control loop is a feedforward control loop in which the position components and the speed signal are determined from the received position signal.

10. The method of claim 1, wherein the disturbance signal corresponds to at least one of:
    mechanical outrun associated with an alignment error of the encoder position sensor and having a frequency corresponding to a mechanical speed of the generator; and
    ovality distortion associated with a physical deformation of the encoder position sensor and having a frequency corresponding to twice the mechanical speed of the generator.

11. A controller for a wind turbine, the controller being configured to:
    receive a position signal, from an encoder position sensor of the wind turbine, indicative of an angular position of a generator shaft of the wind turbine;
    determine a position component of the position signal by (i) identifying a sine position component in the position signal and (ii) identifying a cosine position component in the position signal;
    determine a speed signal based on the position signal;
    determine, in the speed signal, a speed component associated with a disturbance signal in the position signal and indicative of an imperfection associated with the encoder position sensor;
    determine a gain by (i) determining a sine component gain which comprises multiplying the sine position component and the speed component and (ii) determining a cosine component gain which comprises multiplying the cosine position component and the speed component;
    determine a compensation signal with the determined gain to compensate for the disturbance signal;
    modify the position signal by applying the determined compensation signal to the received position signal to determine angular position of the generator shaft; and
    adjust a current from a converter of the wind turbine or a pitch angle of a rotor blade of the wind turbine based on the determined angular position.

12. A wind turbine comprising:
a tower;
a nacelle disposed on the tower;
a rotor extending from the nacelle and having a plurality of blades disposed thereon; and
a controller being configured to:
   receive a position signal, from an encoder position sensor of the wind turbine, indicative of an angular position of a generator shaft of the wind turbine;
   determine a position component of the position signal by (i) identifying a sine position component in the position signal and (ii) identifying a cosine position component in the position signal;
   determine a speed signal based on the position signal;
   determine, in the speed signal, a speed component associated with a disturbance signal in the position signal and indicative of an imperfection associated with the encoder position sensor;
   determine a gain by (i) determining a sine component gain which comprises multiplying the sine position component and the speed component and (ii) determining a cosine component gain which comprises multiplying the cosine position component and the speed component;
   determine a compensation signal with the determined gain to compensate for the disturbance signal;
   modify the position signal by applying the determined compensation signal to the received position signal to determine angular position of the generator shaft; and
   adjust a current from a converter of the wind turbine or a pitch angle of a rotor blade of the wind turbine based on the determined angular position.

* * * * *